United States Patent
Thompson et al.

(10) Patent No.: US 12,227,916 B2
(45) Date of Patent: Feb. 18, 2025

(54) QUICK COUPLER AUTOMATIC LOCKING MECHANISM AND METHOD

(71) Applicant: Caterpillar Inc., Peoria, IL (US)

(72) Inventors: Mark W. Thompson, Manhattan, KS (US); Trent R. Stefek, Wamego, KS (US)

(73) Assignee: Caterpillar Inc., Peoria, IL (US)

( * ) Notice: Subject to any disclaimer, the term of this patent is extended or adjusted under 35 U.S.C. 154(b) by 494 days.

(21) Appl. No.: 17/533,731

(22) Filed: Nov. 23, 2021

(65) Prior Publication Data

US 2023/0160172 A1 May 25, 2023

(51) Int. Cl.
*E02F 3/36* (2006.01)
*F16B 2/06* (2006.01)

(52) U.S. Cl.
CPC .......... *E02F 3/3622* (2013.01); *E02F 3/3663* (2013.01); *F16B 2/06* (2013.01); *F16B 2200/89* (2023.08); *Y10T 29/49826* (2015.01)

(58) Field of Classification Search
CPC ....... E02F 3/3663; E02F 3/3622; E02F 3/365; E02F 3/3627; E02F 3/3645; Y10T 29/49826; F16B 2/06; F16B 2200/89
See application file for complete search history.

(56) References Cited

U.S. PATENT DOCUMENTS

| | | | |
|---|---|---|---|
| 8,011,121 B2 | 9/2011 | Daraie et al. | |
| 8,347,974 B2 | 1/2013 | Calvert et al. | |
| 8,662,817 B2 | 3/2014 | Daraie et al. | |
| 9,217,235 B2 * | 12/2015 | Robl | E02F 9/2296 |
| 9,382,686 B2 | 7/2016 | Friedrich | |
| 9,387,599 B1 * | 7/2016 | Newman | B27L 7/00 |
| 10,184,224 B2 * | 1/2019 | Ito | E02F 3/3663 |
| 10,323,379 B2 * | 6/2019 | Friedrich | E02F 3/3663 |
| 11,702,816 B2 * | 7/2023 | Anderson | E02F 3/3659 |
| | | | 37/468 |
| 11,773,562 B2 * | 10/2023 | Thompson | E02F 3/3627 |
| | | | 414/685 |

(Continued)

FOREIGN PATENT DOCUMENTS

| | | | | |
|---|---|---|---|---|
| EP | 2949193 A1 * | 12/2015 | | A01B 49/06 |
| FR | 3021183 A1 * | 11/2015 | | A01B 49/06 |
| WO | 2021084482 A1 | 5/2021 | | |

OTHER PUBLICATIONS

Written Opinion and International Search Report for Int'l. Patent Appln. No. PCT/US2022/050017, mailed Feb. 28, 2023 (11 pgs).

*Primary Examiner* — Bayan Salone

(57) ABSTRACT

A quick coupler and methods of coupling and decoupling a quick coupler and work tool are disclosed. The quick coupler includes a frame, cylinder, primary blocking member, secondary blocking member, biasing member, and controller. The method of coupling includes activating an AUTOMATIC LOCKING state, automatically locking a second tool pin within a hook, a first tool pin entering a notch, and activating a LOCKED state. The method of decoupling includes activating the AUTOMATIC LOCKING state, resting the work tool on a surface, activating an UNLOCKED state, and separating the quick coupler and work tool. Advantageously, the quick coupler can automatically lock the second tool pin without actuation of the cylinder.

8 Claims, 14 Drawing Sheets

(56) References Cited

U.S. PATENT DOCUMENTS

| | | | |
|---|---|---|---|
| 2013/0160268 A1* | 6/2013 | Parker | E02F 3/3668 403/321 |
| 2013/0160269 A1* | 6/2013 | Parker | E02F 3/3672 403/373 |
| 2013/0318841 A1* | 12/2013 | Robl | E02F 3/3622 37/468 |
| 2016/0281319 A1* | 9/2016 | Park | E02F 3/365 |
| 2021/0238824 A1 | 8/2021 | Anderson et al. | |
| 2023/0160172 A1* | 5/2023 | Thompson | F16B 2/06 403/326 |

* cited by examiner

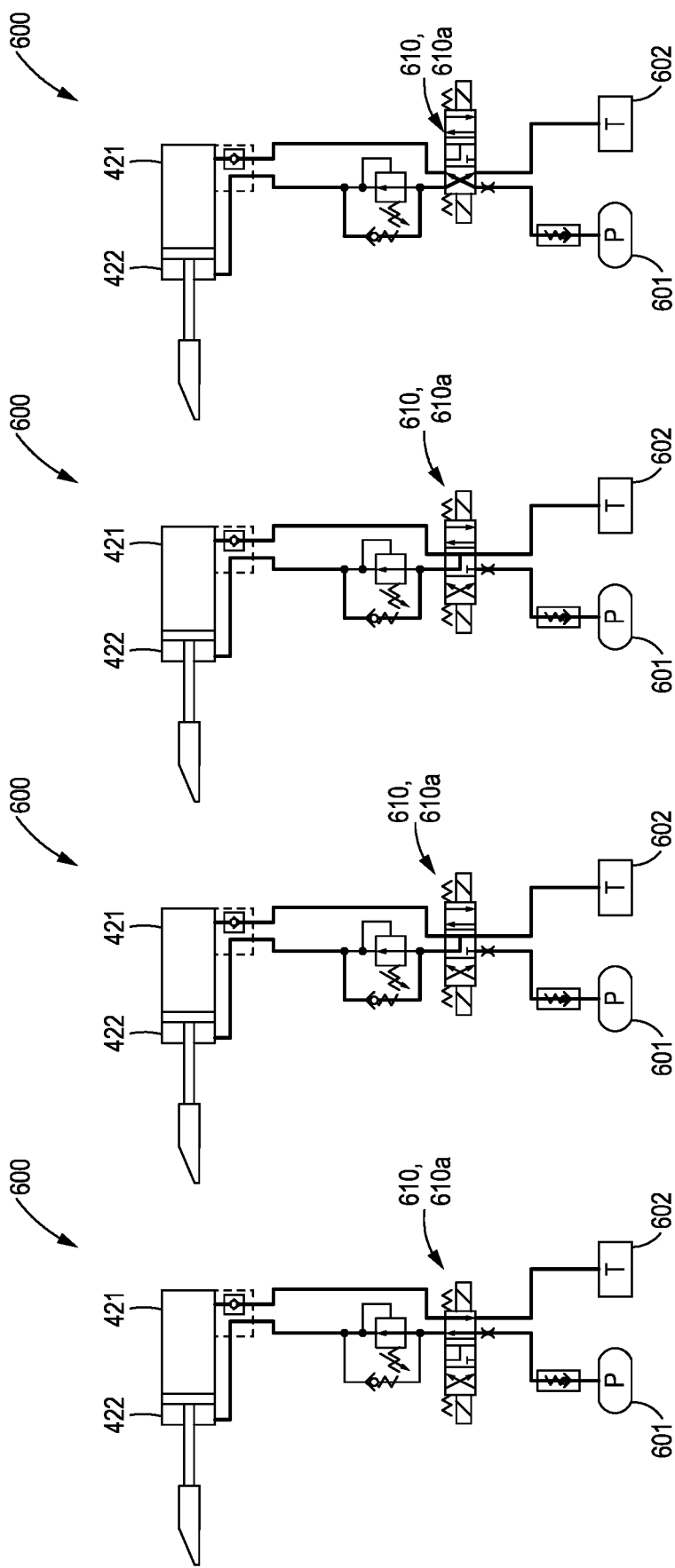

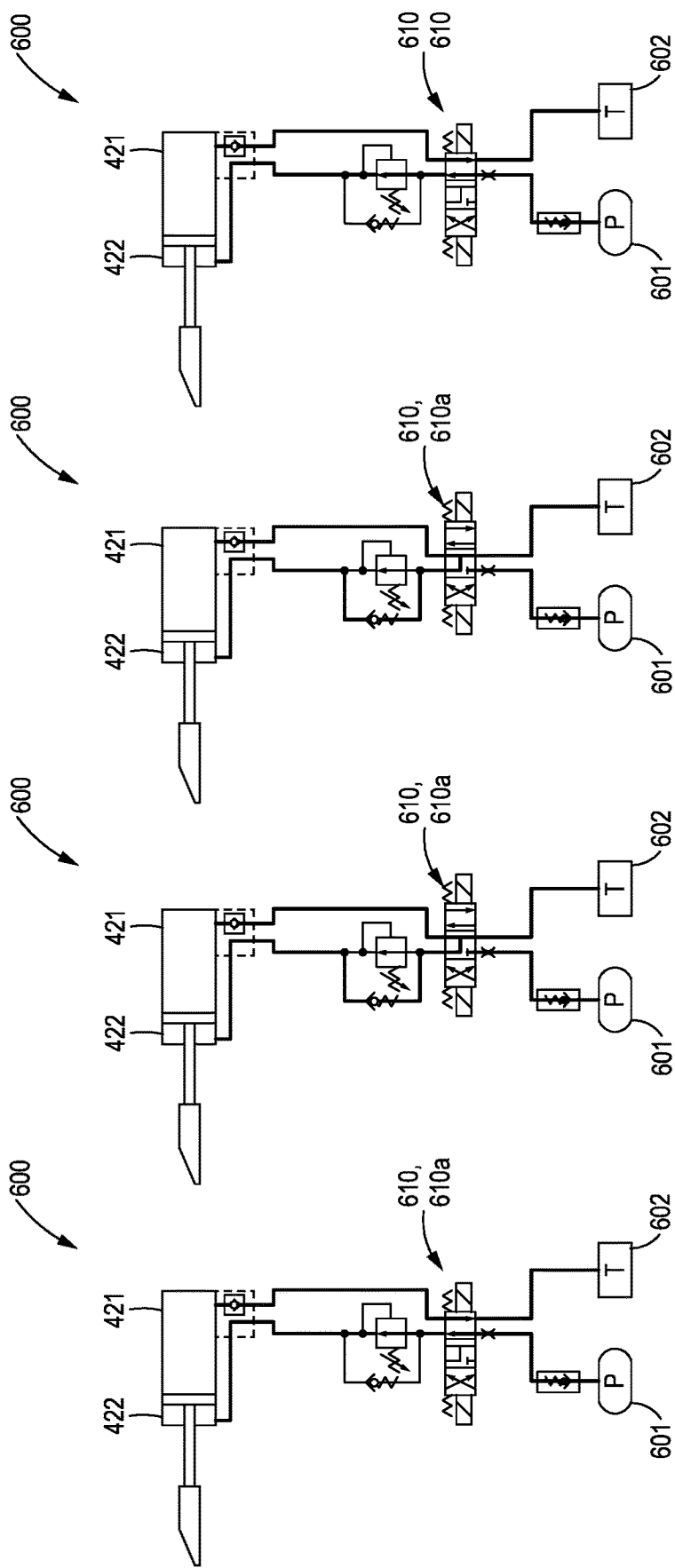

QUICK COUPLER AUTOMATIC LOCKING MECHANISM AND METHOD

TECHNICAL FIELD

The present disclosure generally relates to attachments and work tools for a work machine and, more specifically, to a quick coupler having an automatic locking mechanism.

BACKGROUND

Quick couplers are intermediate attachments for work machines which enable the machine to efficiently switch between different work tools. A quick coupler may be directly connected to an arm of a work machine, which may be an excavator, backhoe, front-end loader, and the like; and the coupler may be movable and actuated by one or more hydraulic cylinders of the work machine. A work tool, such as a bucket, hammer, auger, grapple, and many others, may be connected to the quick coupler through a locking mechanism of the coupler. The work tool may then be maneuvered by the work machine and/or may have the same range of motion as if it were directly connected to the arm. Advantageously, attachment and detachment of the work tool onto the quick coupler may be much quicker and easier than attachment or detachment onto the work machine directly. Moreover, quick couplers are capable of interfacing with a wide range of work tools, even those from different manufacturers.

A pin grabber coupler is a type of quick coupler configured to interoperate with pin-on work tools. Specifically, one or more tool pins of the work tool may be respectively locked into one or more locking zones of the pin grabber coupler. In many prior art designs, the locking zones and the locking mechanism therein are controlled by a single actuator, a configuration which, while simple and efficient, may have disadvantages.

For example, many prior art couplers require an operator of the work machine to perform a precise series of actions to safely attach the tool to the coupler. First, to initially 'grab' the tool, the tool may need to be situated within a specific location with respect to the work machine. If the work tool is situated too far away, too high up, or with an improper angle with respect to its center of gravity and/or tool pin orientation, the operator may need to first reposition either the tool or the machine. Furthermore, according to some prior art designs, the work tool may not be fully secured during the period after which it is 'grabbed' but before the locking mechanism is fully locked, further stressing the need for delicate operator control. Accordingly, such single-actuator couplers may create potentially hazardous situations and allow little room for error on the part of the work machine's operator.

Other pin grabber couplers within the prior art have attempted to improve the above drawbacks by increasing a number of locking mechanisms and a number of locking actuators provided by the coupler. In such designs, the coupler may initially and independently lock onto a first tool pin of the work tool, thereby improving an ease and a security of the coupling maneuvers thereafter. One such example is disclosed by U.S. Pat. No. 10,323,379, invented by Thomas Friedrich and assigned to Kinshofer GMBH. Specifically, Friedrich teaches a quick coupler for a work machine, the coupler comprising a coupling mount and a locking mount configured to receive a first locking part and a second locking part, respectively, of a tool attachment. A securing element is associated with the coupling mount and may be independently actuated by a securing element adjustment actuator. Further, a locking element is associated with the locking mount and may be independently actuated by a locking element adjustment actuator. Friedrich may thus enable either the first locking part of the second locking part of the work tool to be independently attached to the coupler.

Unfortunately, Friedrich also requires additional actuators and associated hydraulic infrastructure to implement independent actuation of the securing element and the locking element, thereby increasing a cost and complexity of their design. In contrast, the single-actuator couplers of the prior art are much simpler in design and manufacture, but demand more complex maneuvers on the part of the work machine operator.

Accordingly, there remains a need in the art for a single-actuator quick coupler capable of independently and automatically locking onto a single tool pin of the work tool, thereby simplifying and safeguarding the coupling without unduly increasing the coupler's complexity and cost.

SUMMARY OF THE DISCLOSURE

According to a first aspect of the present disclosure, a quick coupler is disclosed. The quick coupler comprises a frame including: a notch defining a chamber and having a mouth, the notch configured to receive a first tool pin; and a hook defining a concavity and having an entrance, the hook configured to receive a second tool pin. The quick coupler further comprises a cylinder including a cap end and a rod end; a primary blocking member configured to lock and unlock the first tool pin within the notch, wherein the primary blocking member is attached to one of the cap end and the rod end of the cylinder; a secondary blocking member configured to lock and unlock the second tool pin within the hook, wherein the secondary blocking member is attached to the other of the cap end and the rod end of the cylinder; a biasing member biasing the secondary blocking member toward a locked position; and a controller. The quick coupler can automatically lock the second tool pin within the hook without actuating the cylinder.

According to a second aspect of the present disclosure, a method of coupling a work tool to a quick coupler is disclosed. The method comprises first activating an AUTOMATIC LOCKING state of the coupler. The method further comprises maneuvering the coupler to automatically lock a second tool pin of the work tool within a hook of the coupler without actuation of a cylinder of the coupler, such that: the second tool pin forces a secondary blocking member to move from a locked position to an unlocked position; the second tool pin enters the hook; and the secondary blocking member returns to the locked position. The method further comprises the first tool pin entering a notch of the coupler; and activating a LOCKED state of the coupler.

According to a third aspect of the present disclosure, a method of decoupling a work tool from a quick coupler is disclosed. The method comprises: activating an AUTOMATIC LOCKING state of the coupler. The method further comprises maneuvering the work tool to rest on a surface, during which, without actuating a cylinder of the coupler: a first tool pin exits a notch of the coupler; and a second tool pin is prevented from exiting a hook of the coupler. The method further comprises activating an UNLOCKED state of the coupler; and fully separating the coupler from the work tool.

These and other aspects and features of the present disclosure will be more readily understood after reading the following description in conjunction with the accompanying drawings.

BRIEF DESCRIPTION OF THE DRAWINGS

FIGS. 10A-10D diagram one or more operations of the hydraulic assembly during the method outlined in FIG. 7.

FIGS. 12A-12D diagram one or more operations of the hydraulic assembly during the method outlined in FIG. 8.

DETAILED DESCRIPTION

Figure 1:
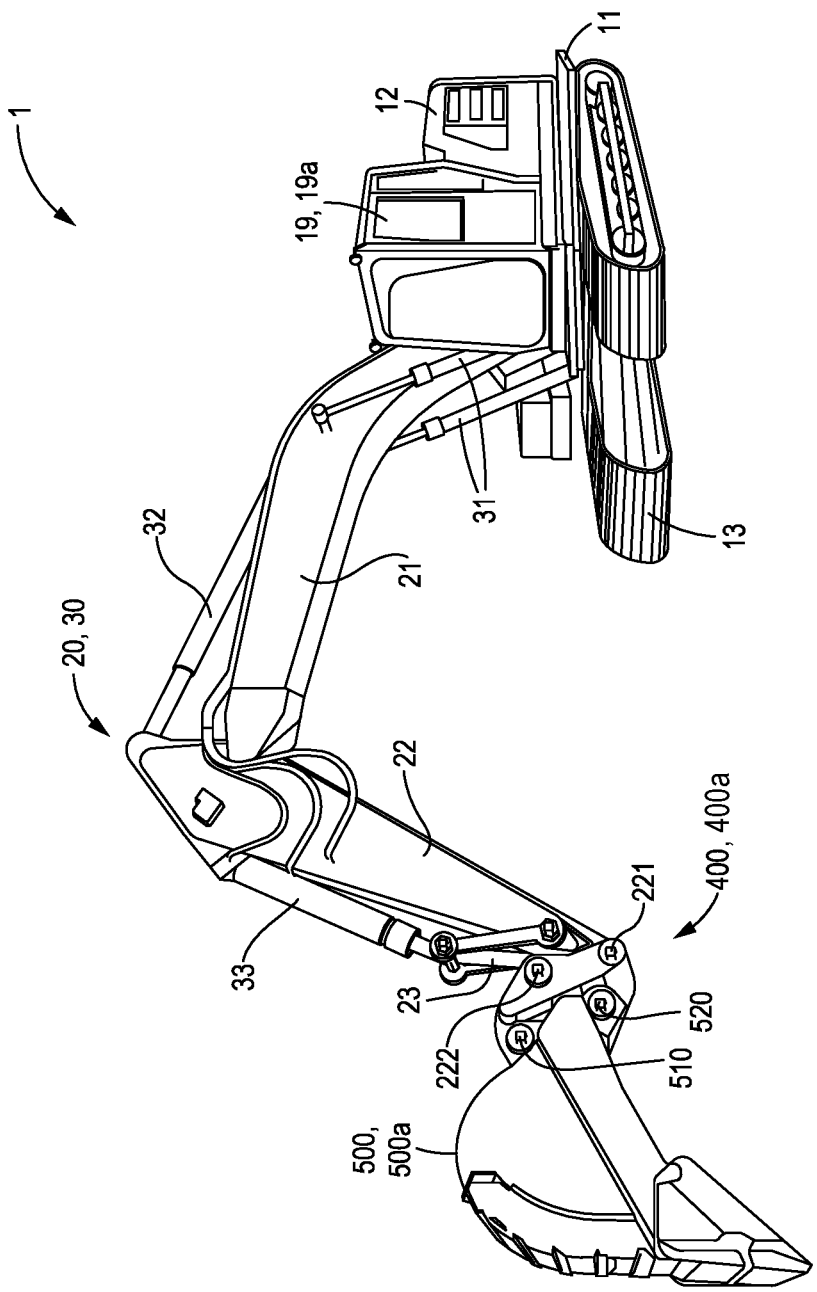
FIG. 1 is an illustration of an exemplary work machine employed in conjunction with a quick coupler according to an embodiment of the present disclosure.

Referring now to the drawings and with specific reference to FIG. 1, a diagram of a work machine is generally referred to by a reference numeral 1. While the work machine 1 is depicted as an excavator, it may alternatively be a mini-excavator, backhoe, front loader, tractor loader, or comparable machine employed in construction, mining, earth moving, and/or agricultural applications. The work machine 1 may specifically comprise a frame 11, a prime mover 12 or engine supported by the frame 11, and a locomotive device 13 supporting the frame 11 and being operatively driven by the prime mover 12.

The work machine 1 may further include an implement arm 20, including one or more of a boom, stick, dipper, and other possible appendages. The implement arm 20 may be operatively controlled by a hydraulic power system 30, e.g. through one or more hydraulic actuators or cylinders. In the embodiment shown, the implement arm 20 may specifically include a boom 21 pivotably mounted at a proximal end to the frame 11 and operable by boom actuators 31, which raise or lower the boom 21 with respect to the frame 11. The implement arm 20 may further include a stick 22 pivotably connected at a proximal end to a distal end of the boom 21 and operable by stick actuators 32, which pivot the stick 22 with respect to the boom 21.

With continued reference to FIG. 1, a quick coupler 400 may be connected to a distal end of the stick 22 and may be operable by one or more tool actuator 33, which pivot the coupler 400 with respect to the stick 22. More specifically, the coupler 400 may be pivotably connected to the stick 22 by a first stick pin 221; and the tool actuator 33 may be operatively connected to the coupler 400 by a power link 23 coupled to a second stick pin 222. In some embodiments, the quick coupler 400 may specifically be a pin grabber coupler 400a, configured to associate with a pin-on work tool.

With continued reference to FIG. 1, the quick coupler 400 may be configured to receive a work tool 500, which may be operatively maneuvered by the implement arm 20 and the hydraulic power system 30 via the coupler 400. In some embodiments, the work tool 500 may specifically be a pin-on work tool 500a, configured to associate with the pin grabber coupler 400a. And while the work tool 500 is illustrated as a bucket, this is by example only, and the tool 500 may alternatively be a grapple, hammer, compactor, claw, blade, or one of many other tools and attachments common to the art. Furthermore, in some embodiments, other configurations for the implement arm 20 and its appendages, and other methods of connecting and operating the quick coupler 400, are also possible without departing from a scope of the present disclosure.

Figure 2:
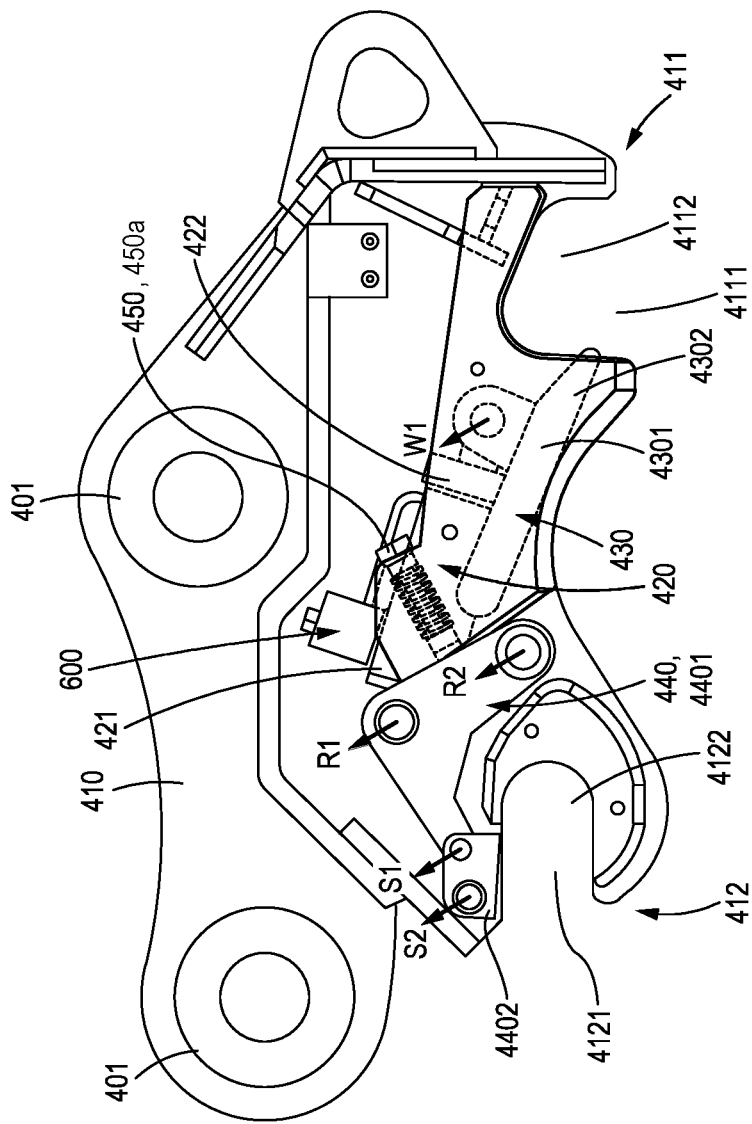
FIG. 2 is a diagram of a quick coupler in an UNLOCKED state according to another embodiment of the present disclosure.

Turning now to FIG. 2, a diagram of the quick coupler 400 is provided in greater detail. The quick coupler 400 may comprise a frame 410, a cylinder 420, a primary blocking member 430, a secondary blocking member 440, a biasing member 450, and a controller (not shown). In some embodiments, the coupler 400 may further comprise a hydraulic assembly 600. The frame 410 may include a pair of ports 401, a notch 411, and a hook 412. The ports 401 may be configured to receive the first stick pin 221 and the second stick pin 222 of the work machine 1. The notch 411 may have a mouth 4111 and may define a chamber 4112. Further, the notch 411 may be configured to receive a first tool pin 510 of the work tool 500. The hook 412 may have an entrance 4121 and define a concavity 4122. Further, the hook may be configured to receive a second tool pin 520 of the work tool 500.

The quick coupler 400 may further comprise a cylinder 420 having a cap end 421 and a rod end 422. A primary blocking member 430 may be attached to either the cap end 421 or the rod end 422 of the cylinder 420; and may be configured to lock and unlock the first tool pin 510 within the notch 411 of the frame 410. A secondary blocking member 440 may be attached to the other of the cap end 421 and the rod end 422 (i.e. the end not attached to the primary blocking member 430); and may be configured to lock and unlock the second tool pin 520 within the hook 412 of the frame 410. While the primary blocking member 430 is shown to be attached to the rod end 422 and the secondary blocking member 440 is shown to be attached to the cap end 421, in other embodiments these attachments can be reversed, i.e. the cylinder 420 can be reversed.

In an embodiment, the primary blocking member 430 may specifically include a wedge 4301 and a tab 4302; and may be rotatably attached to an end of the cylinder 420. In the exemplary embodiment shown in FIG. 2, the wedge 4301 may be rotatably attached to the rod end 422 about a rotation axis W1; and the tab 4302 may be configured to lock and unlock the first tool pin 510 within the notch 411. However, it should be understood that other configurations for the primary blocking member 430 are also possible. Without limitation, the primary blocking member 430 may alternatively or additionally include a rocker, a hook, a catch, and other possible locking mechanisms; the primary blocking member 430 may be connected to the cap end 421 of the cylinder 420 instead; and/or the primary blocking member 430 may include connections with the frame 410.

In an embodiment, the secondary blocking member 440 may specifically include a rocker 4401 and a secondary lock 4402; and may be rotatably attached to the other end of the cylinder 420. In the exemplary embodiment shown in FIG. 2, the rocker 4401 may be rotatably attached to the cap end 421 about a rotation axis R1 and pivotably attached to the frame 410 about a pivot axis R2. In the same or other embodiments, the secondary lock 4402 may be rotatably attached to the rocker 4401 about a rotation axis S1 and pivotably attached to the frame 410 about a pivot axis S2; and the secondary lock 4402 may be configured to lock and unlock the second tool pin 520 within the hook 412. More specifically, a pivoting of the secondary lock 4402 may move the secondary blocking member 440 between a locked and unlocked position (and vice versa). However, it should be understood that other configurations for the secondary blocking member 440 are also possible. Without limitation, the secondary blocking member 440 may alternatively or additionally include a wedge, a tab, a hook, a catch, and other possible locking mechanisms; the secondary blocking member 440 may be connected to the rod end 422 of the cylinder 420 instead; and/or the secondary blocking member 440 may include alternative connections with the frame 410.

With continued reference to FIG. 2, the biasing member 450 may bias the secondary blocking member 440 toward the locked position. In the exemplary embodiment shown, the biasing member 450 may be a spring 450a mounted to the frame 410 and configured to convey a biasing force on the rocker 4401, although other biasing devices and designs are also possible.

The quick coupler 400 may be capable of operating in one of at least three states, including a LOCKED state, an UNLOCKED state, and an AUTOMATIC LOCKING state. Each state will now be discussed in greater detail, and may be best understood with reference to FIG. 9E, FIG. 9A, and FIGS. 9B-9D, respectively.

Figure 9A:
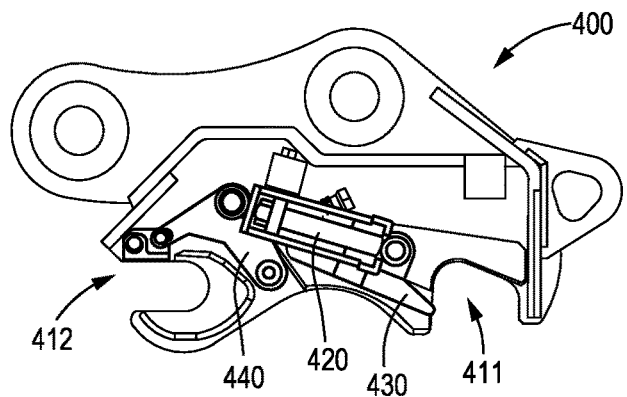
FIG. 9A-9E diagram one or more operations of the quick coupler during the method outlined in FIG. 7
Figure 9B:
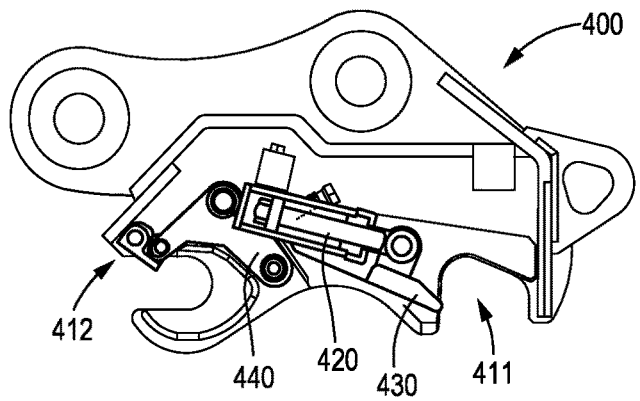
Figure 9C:
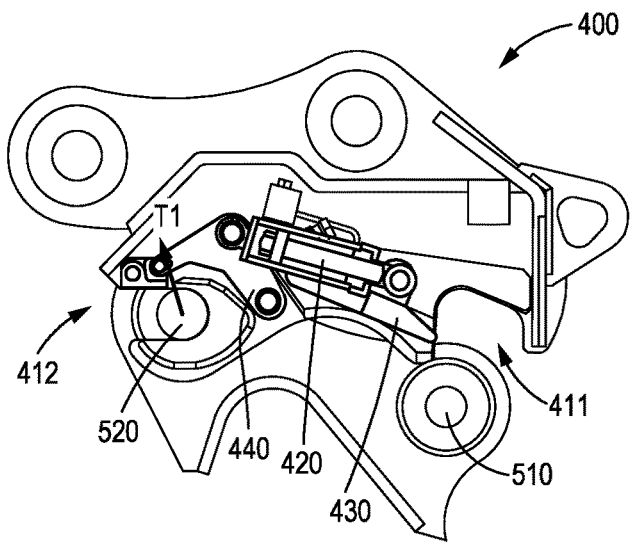
Figure 9D:
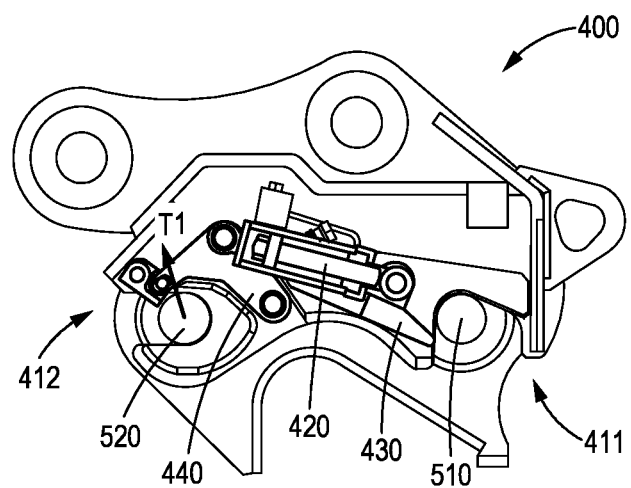
Figure 9E:
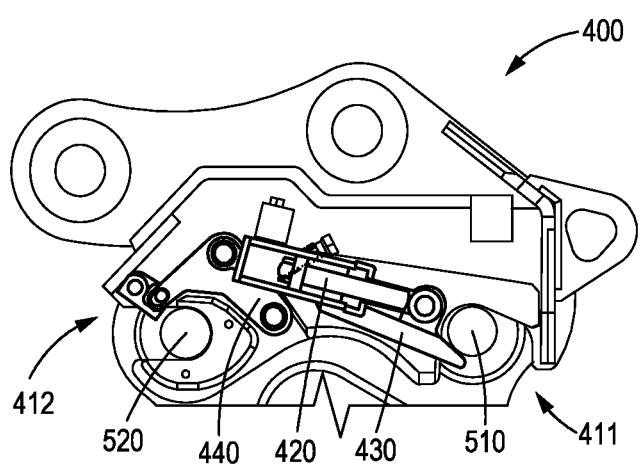

During the LOCKED state, as best depicted in FIG. 9E, the cylinder 420 may be partially or fully extended. Accordingly, the primary blocking member 430 may be in a locked position, and may prevent the first tool pin 510 from entering or exiting the notch 411. In the exemplary embodiment shown, the primary blocking member 430 may include the wedge 4301 and the tab 4302 connected to the rod end 422. Accordingly, the cylinder 420 may be extended such that the tab 4302 blocks the mouth 4111 of the notch 411. Likewise, during the LOCKED state, the secondary blocking member 440 may be in the locked position, and may prevent the second tool pin 520 from entering or exiting the hook 412. In the exemplary embodiment shown, the secondary blocking member 440 may include the rocker 4401 and the secondary lock 4402 connected to the cap end 421. Accordingly, the cylinder 420 may be extended such that the rocker 4401 is pivoted counterclockwise (CCW) about the pivot axis R2, and the secondary lock 4402 is pivoted clockwise (CW) about the pivot axis S2 to block the entrance 4121 of the hook 412. It should be understood that the directions of rotation (i.e. CW, CCW) are provided for clarity only, are made with respect to the reference frames depicted in FIGS. 9A-9E only, and that other directions and rotations are possible in other reference frames.

During the UNLOCKED state, as best depicted in FIG. 9A, the cylinder 420 may be partially or fully retracted. Accordingly, the primary blocking member 430 may be in an unlocked position, and may allow the first tool pin 510 to freely enter or exit the notch 411. In the exemplary embodiment shown, the primary blocking member 430 may include the wedge 4301 and the tab 4302 connected to the rod end 422. Accordingly, the cylinder 420 may be retracted such that the tab 4302 unblocks the mouth 4111 of the notch 411. Likewise, during the UNLOCKED state, the secondary blocking member 440 may be in an unlocked position, and may allow the second tool pin 520 to freely enter or exit the hook 412. In the exemplary embodiment shown, the secondary blocking member 440 may include the rocker 4401 and the secondary lock 4402 connected to the cap end 421. Accordingly, the cylinder 420 may be retracted such that the rocker 4401 is pivoted CW about the pivot axis R2, and the secondary lock 4402 is pivoted CCW about the pivot axis S2 to unblock the entrance 4121 of the hook 412.

Figure 3:
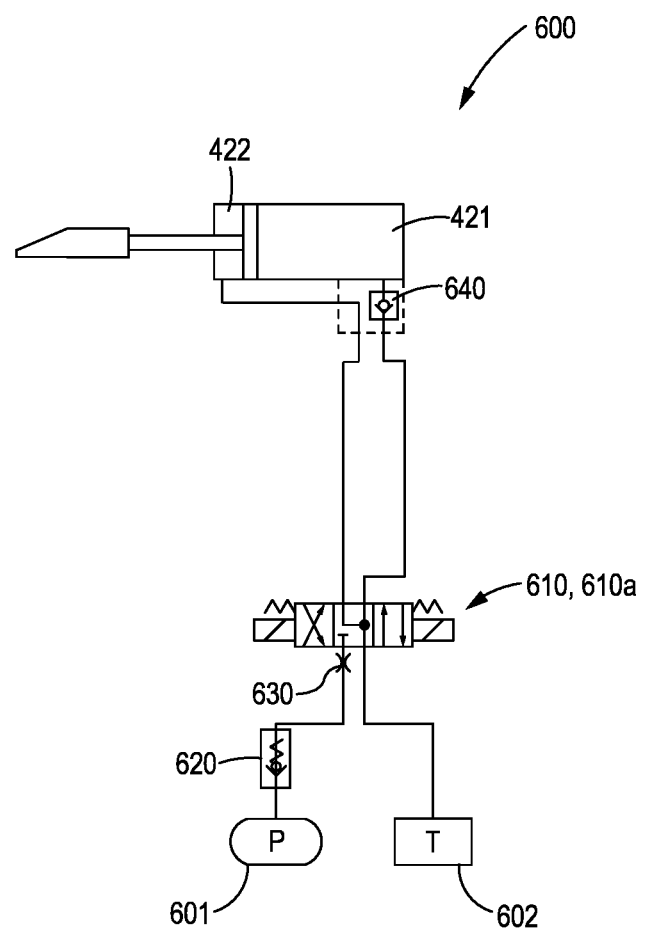
FIG. 3 is a schematic of a hydraulic assembly of the quick coupler according to an embodiment of the present disclosure.

Before describing the AUTOMATIC LOCKING state, the present disclosure may benefit from a brief discussion of the hydraulic assembly 600. In various embodiments, the hydraulic assembly 600 may be placed within the coupler 400, may be partially located within the coupler 400 (as seen in FIG. 2), or may be located external to the coupler 400, depending on specific applicational requirements. With reference now to FIG. 3, the hydraulic assembly 600 may specifically include a directional control assembly 610 controllably connected to one or more of the cap end 421, the rod end 422, a pump 601, and a tank 602. The directional control assembly 610 may be capable of operating in a second position corresponding to and operatively enabling the LOCKED state of the coupler 400, a third position corresponding to and operatively enabling the UNLOCKED state of the coupler 400, and a float position corresponding to and operatively enabling the AUTOMATIC LOCKING state of the coupler. In the exemplary embodiment shown, the directional control assembly 610 may include a 4-way 3-position directional control valve 610a. And in the same or other embodiments, the directional control valve 610a may be solenoid-controlled. In other embodiments, the directional control assembly 610 may be alternatively configured, such as with a 4-way 4-position directional control valve, a 4-way 5-position directional control valve, two 4-way 2-position directional control valves, and yet other possible designs without departing from a scope of the present disclosure.

During the LOCKED state of the coupler 400, the directional control assembly 610 may be operating in the second position. Accordingly, the pump 601 may be connected to the cap end 421 and the tank 602 may be connected to the rod end 422, thereby effecting an extension of the cylinder 420.

During the UNLOCKED state of the coupler 400, the directional control assembly 610 may be operating in the third position. Accordingly, the pump 601 may be connected to the rod end 422 and the tank 602 may be connected to the cap end 421, thereby effecting a retraction of the cylinder 420.

During the AUTOMATIC LOCKING state of the coupler 400, as best depicted in FIGS. 9B-9D, the directional control assembly 610 may operate in the float position seen in FIG. 3. Accordingly, the directional control assembly 610 may operatively connect the cap end 421, the rod end 422, and the tank 602, thereby removing most if not all hydraulic pressure imparted on the cylinder 420. Under such conditions, and barring external forces, the cylinder 420 may remain in a position similar to its position before the AUTOMATIC LOCKING state was activated; and the primary blocking member 430 and the secondary blocking member 440 may likewise remain in their prior positions.

However, during the AUTOMATIC LOCKING state, the biasing member 450 biases the secondary blocking member 440, such that the secondary blocking member 440 is moved to the locked position. It may be understood that, while the biasing member 450 may provide a biasing force in all operating states of the coupler 400, its force may be negated by hydraulic pressures during the LOCKED and UNLOCKED states. In an embodiment, the biasing member 450 may be a spring 450a and the secondary blocking member may include the rocker 4401 and the secondary lock 4402. Accordingly, the spring 450a may bias the rocker 4401 to rotate CCW about the pivot axis R2, such that the secondary lock 4402 is pivoted CW about the pivot axis S2 to block the entrance 4121 of the hook 412.

Furthermore, during the AUTOMATIC LOCKING state, the secondary blocking member 440 may allow the second tool pin 520 to enter the hook 412 if the biasing force of the biasing member 450 is overcome. In other words, an operator may force the secondary blocking member 440 open by moving the coupler 400 to forcibly receive the second tool pin 520 within the hook 412. Once the second tool pin 520 enters the hook 412, the secondary blocking member 440 may return to the locked position, and may prevent the second tool pin 520 from exiting the hook 412. In other words, during the AUTOMATIC LOCKING state, the coupler 400 may be capable of automatically locking the second tool pin 520 within the hook 412 without any actuation of the cylinder 420. In some embodiments, the secondary blocking member 440 may be configured such that no amount of force in an exiting direction can move the secondary blocking member 440 into the unlocked position.

During the AUTOMATIC LOCKING state, the primary blocking member 430 may retain its position prior to the coupler 400 entering the AUTOMATIC LOCKING state. For example, if the previous state was the UNLOCKED state, the primary blocking member 430 may remain in an unlocked position. In some embodiments, the UNLOCKED state may always precede the AUTOMATIC LOCKING state, such that the primary blocking member 430 is always in the unlocked position during the AUTOMATIC LOCKING state. And in yet other embodiments, the primary blocking member 430 may be in the unlocked position during the AUTOMATIC LOCKING state, regardless of a prior state of the coupler 400.

With reference now to FIGS. 3-6, several embodiments of the hydraulic assembly 600 will now be described in greater detail. As previously discussed, the assembly 600 may be partially or fully located inside the coupler 400. For the purposes of this disclosure, the terms 'downstream' and 'upstream' may refer to a directionality of each component, i.e. a check valve may only allow fluid flow in the 'downstream' direction.

As seen in FIG. 3, the hydraulic assembly 600 may comprise the directional control assembly 610 operatively connected to the cap end 421, the rod end 422, the pump 601, and the tank 602. In an embodiment, the directional control assembly 610 may specifically include the 4-way 3-position directional control valve 610a. In addition, the hydraulic assembly 600 may comprise a first check valve 620, which may be a spring check valve, located downstream of the pump 601 and upstream of the directional control assembly 610. In an embodiment, a flow control element 630, which may be a fixed orifice, may be located between the first check valve 620 and upstream of the directional control assembly 610. The assembly 600 may further comprise a first pilot-operated (PO) check valve 640 downstream of the directional control assembly 610 and upstream of the cap end 421. In some embodiments, the hydraulic assembly 600 shown in FIG. 3 may be adequate to implement automatic locking mechanisms for a pin grabber coupler styled quick coupler.

Figure 4:
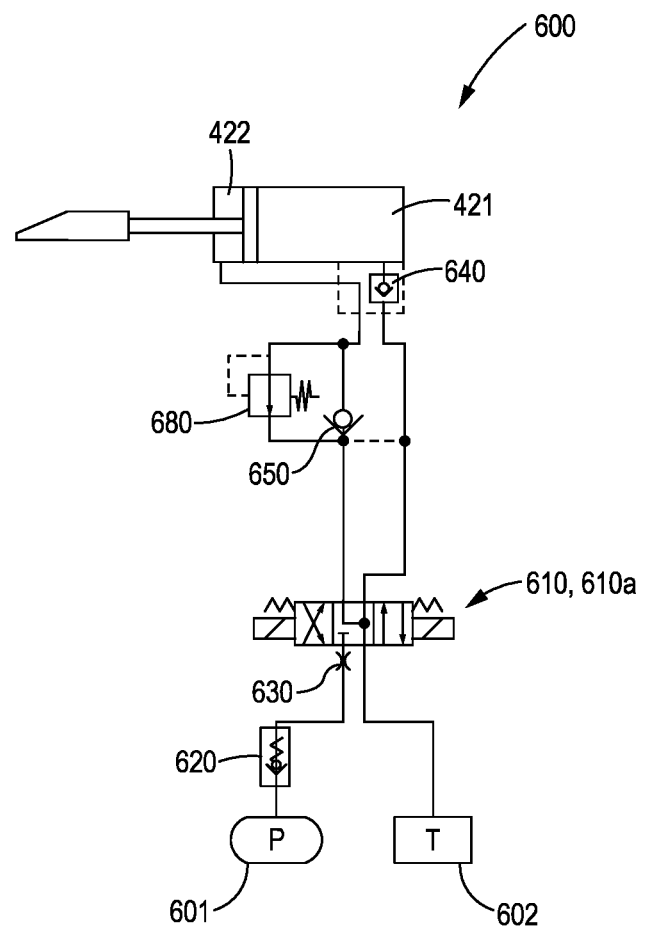
FIG. 4 is a schematic of a hydraulic assembly according to another embodiment of the present disclosure.

Turning now to FIG. 4, another embodiment of the hydraulic assembly 600 is shown. Specifically, the hydraulic assembly 600 may comprise at least the elements shown in FIG. 3, and may further comprise a second PO check valve 650, located downstream of the rod end 422, upstream of the directional control assembly 610, and receiving a pilot pressure from the cap end 421. The assembly 600 may further comprise a pressure relief valve 680 located downstream of the rod end 422, upstream of the directional control assembly 610, and connected in parallel with the second PO check valve 650. In some embodiments, the second PO check valve 650 may a prevent momentary bleeding of pressure from the rod end 422 of the cylinder 420 during transitions of the directional control assembly 610. And in some embodiments, the hydraulic assembly 600 shown in FIG. 4 may be adequate to implement automatic locking mechanisms for a pin grabber coupler styled quick coupler.

Figure 5:
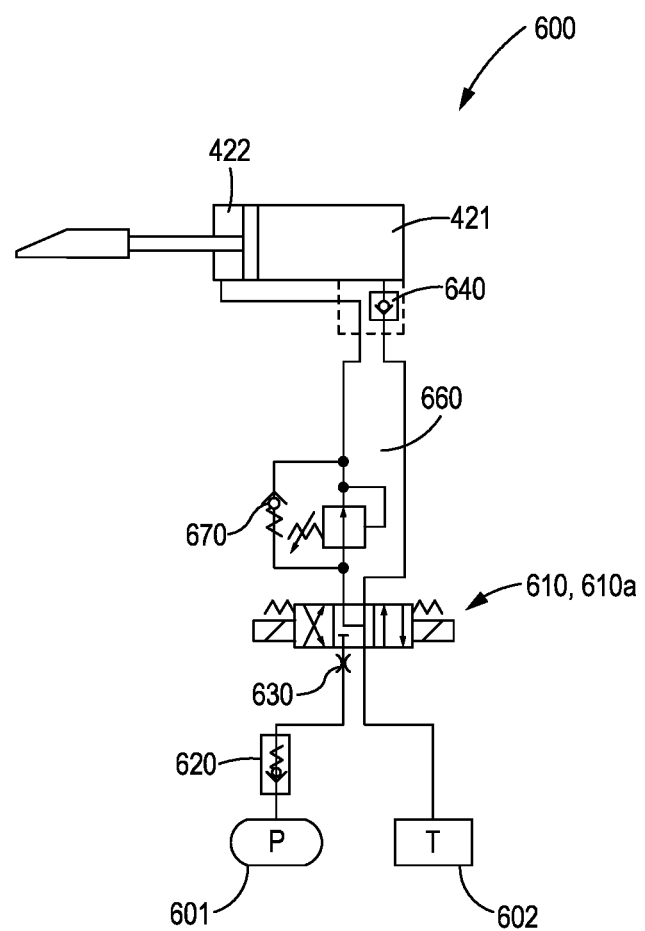
FIG. 5 is a schematic of a hydraulic assembly according to another embodiment of the present disclosure.

Turning now to FIG. 5, another embodiment of the hydraulic assembly 600 is shown. Specifically, the hydraulic assembly 600 may comprise at least the elements shown in FIG. 3. Moreover, the assembly 600 may comprise a pressure reducing valve 660 downstream of the directional control assembly 610 and upstream of the rod end 422; and and a second check valve 670, which may be a spring check valve, downstream of the rod end 422, upstream of the directional control assembly 610, and connected in parallel with the pressure reducing valve 660. In some embodiments, the hydraulic assembly 600 shown in FIG. 5 may be adequate to implement an automatic locking mechanism for any style of quick coupler.

Figure 6:
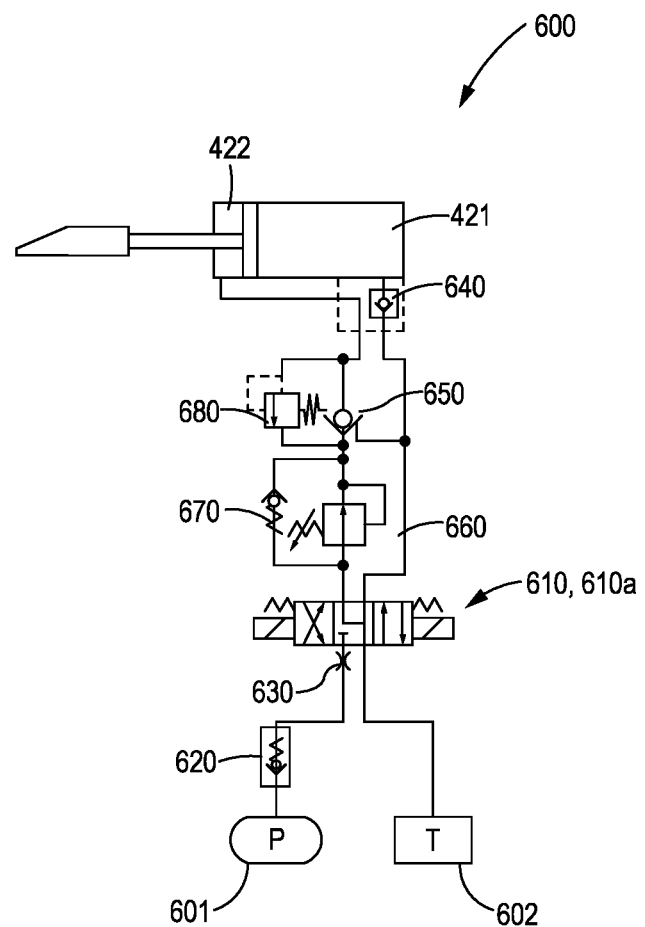
FIG. 6 is a schematic of a hydraulic assembly according to another embodiment of the present disclosure.

Turning now to FIG. 6, yet another possible embodiment of the hydraulic assembly 600 is provided. The assembly 600 may comprise at least the elements shown in FIG. 5. Moreover, the assembly 600 may further comprise the second PO check valve 650 located downstream of the pressure reducing valve 660 and upstream of the rod end 422. Furthermore, the pressure relief valve 680 may be located downstream of the rod end 422, upstream of the second check valve 670, and connected in parallel with the second PO check valve 650. In some embodiments, the hydraulic assembly 600 shown in FIG. 6 may be adequate to implement an automatic locking mechanism for any style of quick coupler.

In some embodiments, the pressure relief valve 680 may prevent the primary blocking member 430 from inadvertently drifting when the directional control assembly 610 is operating in the float position, i.e. when the coupler 400 is in the AUTOMATIC LOCKING state. More specifically, when transitioning between the LOCKED state and the AUTOMATIC LOCKING state, the pressure relief valve 680 may be configured to allow a pressure release of the rod end 422 in order to prevent the primary blocking member 430 from drifting into the locked position, but nonetheless allowing the biasing member 450 to bias the secondary blocking member 440 into the locked position.

In other embodiments, when transitioning between the LOCKED state and the AUTOMATIC LOCKING state, the primary blocking member 430 may be held in a prior position through a force of friction only, such as in the exemplary embodiments shown in FIGS. 3 and 5. And in yet other embodiments, the primary blocking member 430 may be permitted to drift slightly away from a prior position during the AUTOMATIC LOCKING state, so long as the notch 411 remains unblocked.

The hydraulic assembly 600 may be managed by a controller (not shown), the controller having a processor and a memory in the form of a non-transitory computer-readable medium. The controller may be, without restriction, a gateway computer, a field-programmable gate array (FPGA), an application-specific integrated circuit ASIC), an engine control unit (ECU) of the work machine 1, or comparable computing device capable of receiving inputs and outputting commands to the hydraulic assembly 600. The controller may be in operative communication with an operator of the work machine 1, and may receive commands from the operator through any number of input devices 19 of the work machine 1, such as but not limited to buttons, dials, switches, pedals, knobs, touchscreens, and the like.

The controller may operatively control the state of the coupler 400 (e.g. LOCKED, UNLOCKED, or AUTOMATIC LOCKING) according to inputs received from the operator and/or from the input devices 19. In one embodiment, the input devices 19 may include a coupler switch 19a. And in the same or other embodiments, the coupler switch 19a may include one or more of the following settings: 'temporary unlock', 'permanent unlock', 'permanent lock', and 'automatic locking', each of which will be discussed in greater detail below.

By employing the disclosed designs, a quick coupler may be improved with an automatic locking mechanism without requiring additional actuators, thereby improving an ease and security of a tool coupling process without increasing underlying costs.

INDUSTRIAL APPLICATION

The present disclosure may find industrial applicability in any number of work machines which employ quick couplers in order to switch between different tool attachments. While the work machine is depicted as an excavator in certain embodiments, the present disclosure may likewise apply to mini-excavators, backhoes, front-end loaders, forest machines, material handlers, and other, comparable vehicles and machinery employed in construction, mining, earth moving, and/or agricultural applications. Furthermore, while the work tool is depicted as a bucket in certain embodiments, the quick coupler may be configured to attach to one of any number of work tools, including but not limited to augers, blades, bale grabs, compactors, forks, hammers, grapples, pulverizers, rippers, and many others. Moreover, the coupler may be capable of interlocking with work machines and with work tools from different manufacturers and product lines.

By employing the designs disclosed herein, a quick coupler may automatically lock onto a single tool pin of a work tool, decreasing an overall difficulty and improving an overall safety of the tool attachment process. More specifically, the automatic locking mechanism of the coupler may enable an operator to 'grab' a work tool situated at closer and/or further distances with respect to the work machine, situated at lower and/or higher elevations with respect to the work machine, and situated in a greater range of angles with respect to the tool's center of gravity or tool pin orientation. Once the first (or second) tool pin is secured, the automatic locking feature may decrease if not eliminate the possibility of detachment between the coupler and the work tool during the subsequent coupling maneuvers, making the process easier and safer for both equipment and personnel. Furthermore, when decoupling the work tool from the quick coupler, the same advantages with regard to operator ease, procedure safety, and machine range of motion may be afforded.

The above improvements may be obtained without increasing a complexity or cost of the coupler. More specifically, the quick coupler of the present disclosure can enable automatic locking and, indeed, independent locking of the second tool pin, with only a single hydraulic cylinder controlling both locking zones, i.e. the notch and the hook. Advantageously, in some embodiments, an existing quick coupler may be retrofitted with the disclosed designs through minor modifications to its hydraulic assembly and/or modifications to a logic controlling the hydraulic assembly.

Figure 7:
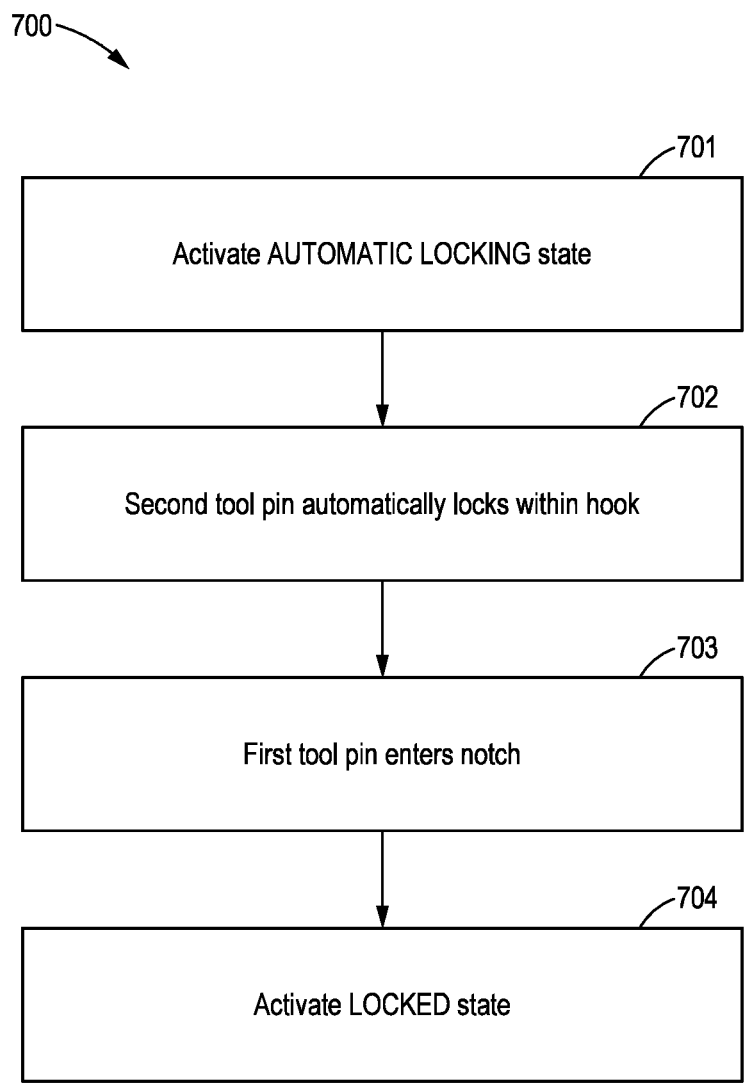
FIG. 7 is a flowchart outlining a method of coupling a work tool to a quick coupler according to an embodiment of the present disclosure.

Turning now to FIG. 7, a method of coupling a work tool to a quick coupler is generally referred to by a reference numeral 700. The method 700 may best understood in consideration of FIGS. 9A-9E and FIGS. 10A-10D, the former depicting an operation of the coupler and the latter illustrating an operation of the hydraulic assembly throughout the coupling process. The method 700 may comprise activating an AUTOMATIC LOCKING state of the coupler (block 701), maneuvering the coupler to automatically lock a second tool pin within a hook of the coupler (block 702), the first tool pin entering a notch of the coupler (block 703), and activating a LOCKED state of the coupler (block 704), each step of which will be discussed in greater detail below.

The method may comprise first activating an AUTOMATIC LOCKING state of the coupler (block 701). In some embodiments, the AUTOMATIC LOCKING state may be activated by operating a coupler switch, which may be located on the work machine 1 or located remotely. For example, the AUTOMATIC LOCKING state may be activated by switching the coupler switch to an 'automatic locking' setting.

In other embodiments, the AUTOMATIC LOCKING state may be activated if/when the operator executes a specific order of actions. For example, the AUTOMATIC LOCKING state may be activated if and/or only if the operator first curls the coupler, and switches the coupler switch to a 'temporary unlock' setting, thereby first activating an UNLOCKED state of the coupler. In such embodiments, an onboard computer of the work machine, the controller of the coupler, or another system may detect the order of actions, which effectively command the coupler to activate the AUTOMATIC LOCKING state. In other embodiments, alternative switches, inputs, and series of actions may be programmed to activate the AUTOMATIC LOCKING state, where no limitation is intended herein. Finally, in the same or other embodiments, the coupler may always enter the UNLOCKED state before activating the AUTOMATIC LOCKING state.

During the UNLOCKED state, a directional control assembly may operate in a third position operatively connecting a rod end of the cylinder to a pump and a cap end of the cylinder to a tank, as best seen in FIG. 10A. The cylinder may retract such that both the primary blocking member and the secondary blocking member move to an unlocked position, as best seen in FIG. 9A. At the same time, a biasing member may bias the secondary blocking member toward a locked position. However, when the coupler is in the UNLOCKED state, the force applied by the biasing member may be negated by the cylinder's hydraulic pressure.

After a predetermined period in the UNLOCKED state, such as a time require to fully retract the cylinder, the coupler may enter the AUTOMATIC LOCKING state.

Accordingly, the directional control assembly may operate in a float position operatively connecting the rod end and the cap end to the tank, as best seen in FIG. 10B. This may reduce hydraulic pressure to the cylinder, such that the biasing force of the spring is no longer negated. The secondary blocking member may thus be biased by the biasing member to move to the locked position, while the primary blocking member may remain in the unlocked position, as best seen in FIG. 9B.

Returning now to FIG. 7, the method 700 may comprise an operator maneuvering the coupler to automatically lock the second tool pin within the hook (block 702). More specifically, the coupler may be maneuvered such that second tool pin forces the secondary blocking member to move from the locked position into the unlocked position; such that the second tool pin enters the hook; and such that the secondary blocking member returns to the locked position. In an exemplary embodiment seen in FIG. 9C, the second tool pin may exert an entry force against a secondary lock rotatably attached to a rocker, and may rotate the secondary lock to force the secondary blocking member from the locked position to the unlocked position. Once the second tool pin enters the hook, the biasing member may return the secondary blocking member to the locked position. In some embodiments, the coupler may be configured such that no amount of exit force exerted by the second tool pin can move the secondary blocking member from the locked state into the unlocked state. Furthermore, throughout block 702 of the method 700, the directional control assembly may continue to operate in the float position, as seen in FIG. 10B. Accordingly, automatically locking the second tool pin within the hook may occur without any actuation of the cylinder.

With reference again to FIG. 7, the method 700 may further comprise the first tool pin entering a notch of the coupler (block 703). In some embodiments, this step may entail an operator lifting the work tool off a surface and curling the coupler, i.e. pivoting the coupler with respect to an implement arm of the work machine. As the work tool is raised from the surface, it may lose any normal forces exerted by the surface and may hang from the hook of the coupler by the second tool pin. Furthermore, as the coupler is curled, the coupler may rotate with respect to the work tool about a rotation axis T1 of the second tool pin, while an orientation of the work tool may stay relatively unchanged due to gravity. As best seen in FIG. 9D, the coupler may be rotated with respect to the work tool such that the first tool pin freely enters the notch. Moreover, throughout block 703, the directional control assembly may continue to operate in the float position, as seen in FIG. 10C, again without any additional actuation of the cylinder.

Returning once again to FIG. 7, the method 700 may finally comprise activating a LOCKED state of the quick coupler (block 704). In some embodiments, the LOCKED state may be activated by operating the coupler switch, e.g. by switching to a 'permanent lock' setting. In the same or other embodiments, when the LOCKED state is activated, the directional control assembly may operate in the second position connecting the cap end of the cylinder to the pump and the rod end of the cylinder to the tank, as best seen in FIG. 10D. Accordingly, the cylinder may partially or fully extend such that both the primary blocking member and the secondary blocking member move to the locked position, as best seen in FIG. 9E. Accordingly, both the first tool pin and the second tool pin of the work tool may be securely attached to the coupler, thereby completing the coupling process.

It may be appreciated that in some or all of the above embodiments, each step of method 700 may be operatively performed by an operator of the work machine.

Figure 8:
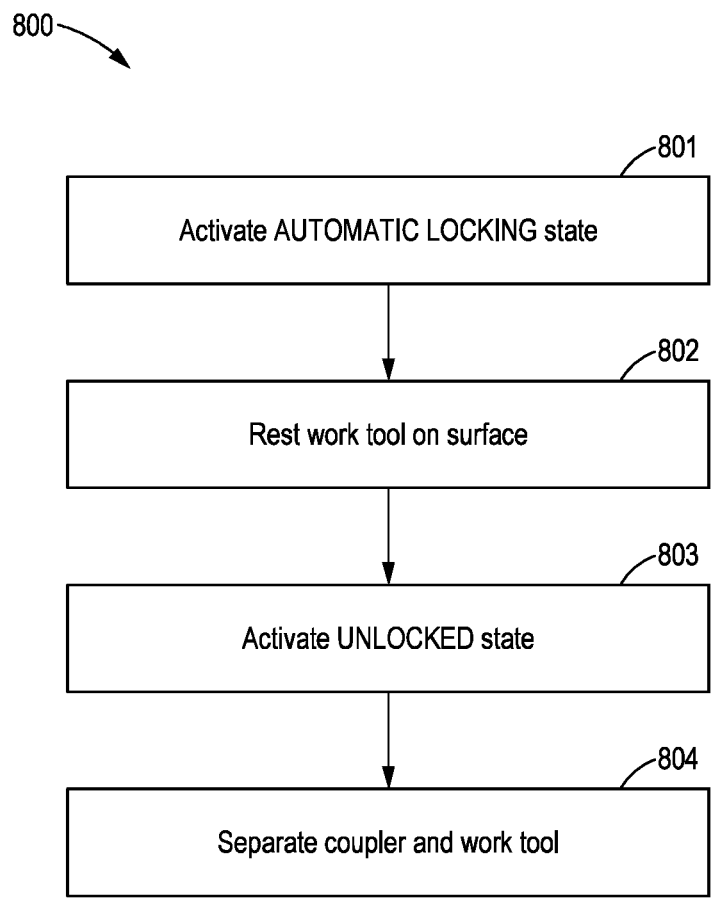
FIG. 8 is a flowchart outlining a method of decoupling a work tool from a quick coupler according to another an embodiment of the present disclosure.
Figure 11A:
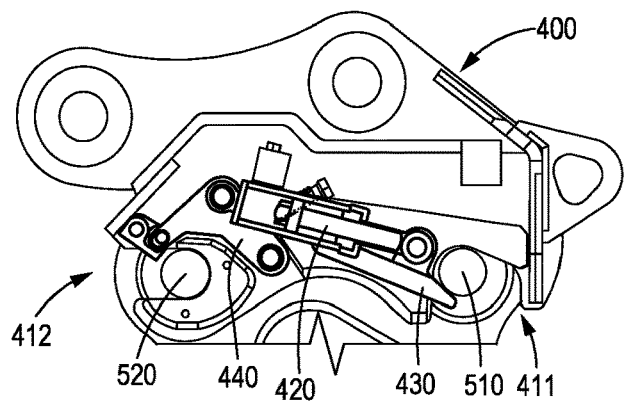
FIGS. 11A-11E diagram one or more operations of the quick coupler during the method outlined in FIG. 8.

Turning now to FIG. 8, a method of decoupling a work tool from a quick coupler is generally referred to by a reference numeral 800. The method 800 may best be understood in consideration of FIGS. 11A-11E and FIGS. 12A-12D, the former depicting an operation of the coupler and the latter illustrating an operation of the hydraulic assembly throughout the process. The method 800 may comprise activating an AUTOMATIC LOCKING state of the coupler (block 801), maneuvering the work tool to rest on a surface (block 802), activating an UNLOCKED state of the coupler (block 803), and fully separating the coupler from the work tool (block 804), each step of which will be discussed in greater detail below. Note that the method 800 assumes a starting configuration wherein the work tool is attached to the coupler, as seen in FIG. 11A.

The method may comprise first activating an AUTOMATIC LOCKING state of the quick coupler (block 801). In some embodiments, the AUTOMATIC LOCKING state may be activated by operating a coupler switch, for example by switching the coupler switch to an 'automatic locking' setting.

In other embodiments, the AUTOMATIC LOCKING state may be activated if/when the operator executes a specific order of actions. For example, the AUTOMATIC LOCKING state may be activated if and/or only if the operator first curls the coupler, and switches the coupler switch to a 'temporary unlock' setting, thereby first activating an UNLOCKED state of the coupler. In such embodiments, an onboard computer of the work machine, the controller of the coupler, or another system may detect the order of actions, which effectively command the coupler to activate the AUTOMATIC LOCKING state.

Figure 11B:
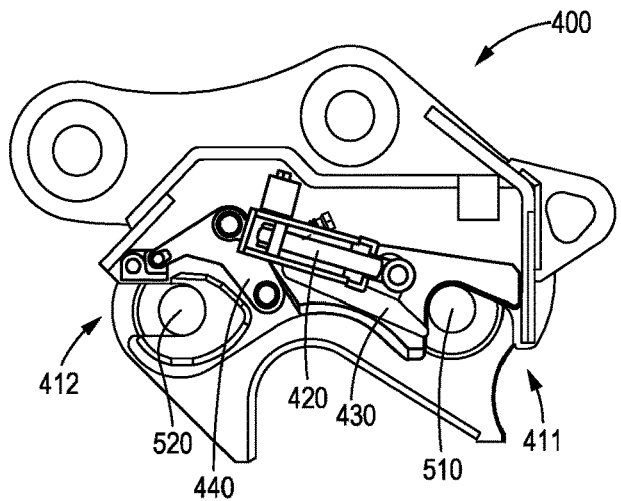

During the UNLOCKED state, a directional control assembly may operate in a third position connecting a rod end of the cylinder to a pump and a cap end of the cylinder to a tank, as best seen in FIG. 12A. Accordingly, the cylinder may retract such that both the primary blocking member and the secondary blocking member move to an unlocked position, as best seen in FIG. 11B. At the same time, a biasing member may bias the secondary blocking member toward a locked position. However, when the coupler is in the UNLOCKED state, the force applied by the biasing member may be negated by the cylinder's hydraulic pressure.

Figure 11C:
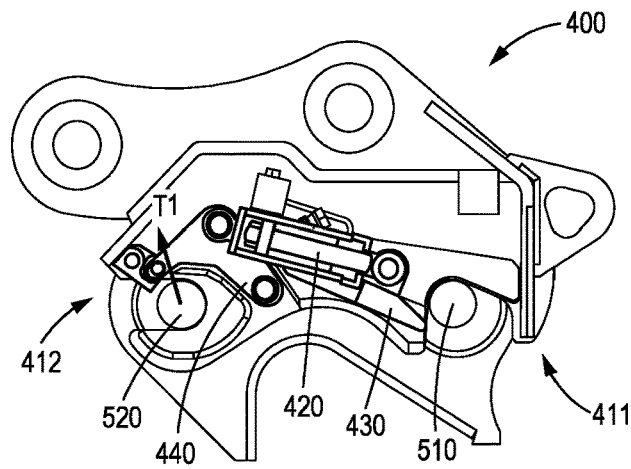

After a predetermined period in the UNLOCKED state, such as a time require to fully retract the cylinder, the coupler may enter the AUTOMATIC LOCKING state. The directional control assembly may operate in a float position connecting the rod end and the cap end to the tank, as best seen in FIG. 12B. This may reduce hydraulic pressure to the cylinder, such that the biasing force of the spring is no longer negated. The secondary blocking member may thus be biased by the biasing member to move to the locked position, while the primary blocking member may remain in the unlocked position, as best seen in FIG. 11C.

Returning now to FIG. 8, the method 800 may comprise the operator maneuvering the work machine to move the work tool to rest on a surface (block 802). In some embodiments, the work tool may be attached to the coupler only by the second tool pin, which is hanging from the hook of the coupler and prevented from exiting said hook by the secondary blocking member, as best seen in FIG. 11C. And as previously discussed, the coupler may be configured such that no amount of exit force exerted by the second tool pin can move the secondary blocking member away from the locked. Meanwhile, the first tool pin of the work tool may freely exit the notch of the coupler. More specifically, as the operator maneuvers the work tool, the coupler may rotate with respect to the work tool about the rotation axis T1 of the second tool pin, such that the first tool pin freely exits the notch. Furthermore, throughout block 802, the directional control assembly may continue to operate in the float position, as seen in FIG. 12C. Accordingly, manipulation of the work tool during block 802 may occur without any actuation of the cylinder.

Figure 11D:
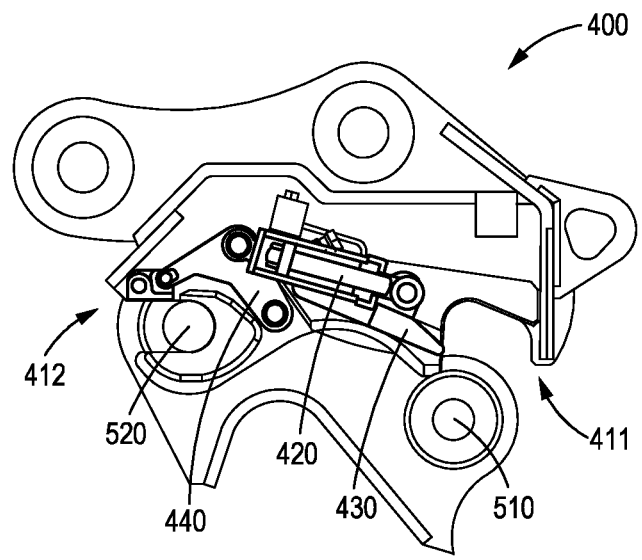

With continued reference to FIG. 8, the method 800 may finally comprise activating the UNLOCKED state of the coupler (block 803). In some embodiments, the UNLOCKED state may be activated by operating the coupler switch, e.g. by switching to a 'permanent unlock' setting. The 'permanent unlock' setting may differ from the 'temporary unlock' setting in that it is not followed by the AUTOMATIC LOCKING state. In the same or other embodiments, when the UNLOCKED state is activated, the directional control assembly may operate in the third position connecting the rod end of the cylinder to the pump and connecting the cap end to the tank, as best seen in FIG. 12D. Accordingly, the cylinder may retract such that the primary blocking member remains in the unlocked position, and such that the secondary blocking member moves to the unlocked position, as best seen in FIG. 11D. While the biasing member may still provide a biasing force on the secondary blocking member, said force may be negated by the cylinder's hydraulic pressure.

Figure 11E:
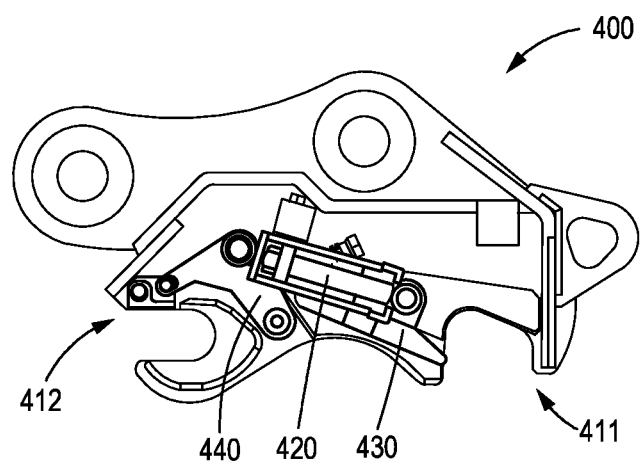

In the UNLOCKED state, the first tool pin may freely exit the notch if it has not already done so. Moreover, the second tool pin may freely exit the hook. Thus, in a final step of method 800, the operator may fully separate the coupler from the work tool (block 804), as seen in FIG. 11E. Since the two components are not longer interlocked, the operator may simply maneuver the work machine to physically move the coupler away from the tool, thereby completing the decoupling process.

It may be appreciated that in some or all of the above embodiments, each step of the method 800 may be operatively performed by an operator of the work machine.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A method of coupling a work tool to a quick coupler comprising the steps of:
   activating an AUTOMATIC LOCKING state of the coupler;
   maneuvering the coupler to automatically lock a second tool pin of the work tool within a hook of the coupler without actuation of a cylinder of the coupler, such that;
   the second tool pin forces a secondary blocking member to move from a locked position to an unlocked position;
   the second tool pin enters the hook; and
   the secondary blocking member returns to the locked position;
   the first tool pin entering a notch of the coupler; and
   activating a LOCKED state of the coupler.

2. The method according to claim 1, further comprising the following steps before activating the AUTOMATIC LOCKING state;
   curling the coupler;
   switching a coupler switch to a temporary unlock setting; and
   activating an UNLOCKED state of the coupler.

3. The method according to claim 2, further comprising:
   a biasing member biasing the secondary blocking member toward the locked position;
   the step of activating the UNLOCKED state further including;
      the cylinder of the coupler retracting such that:
         the primary blocking member moves to the unlocked position; and
         the secondary blocking member moves to an unlocked position;
   the step of activating the AUTOMATIC LOCKING state further including:
      reducing hydraulic pressure to the cylinder such that:
         the primary blocking member remains in the unlocked position; and
         the secondary blocking member moves to the locked position.

4. The method according to claim 2,
   the step of activating the UNLOCKED state further including:
      a directional control assembly operatively connecting the rod end of the cylinder to a pump and operatively connecting a cap end of the cylinder to a tank;
      the step of activating the AUTOMATIC LOCKING state further including:
      the directional control assembly operatively connecting the rod end and the cap end of the cylinder to the tank.

5. The method according to claim 1, the step of the first tool pin entering a notch of the coupler further including:
   the second tool pin hanging from the hook; and
   the coupler rotating with respect to the work tool about a rotation axis of the second tool pin.

6. The method according to claim 1, the step of activating the LOCKED state further including:
   a cylinder of the coupler extending such that:
      a primary blocking member moves to a locked position; and
      the secondary blocking member moves to the locked position.

7. The method according to claim 6, the step of activating the LOCKED state further including:
   switching a coupler switch to a permanent lock setting; and
   a directional control assembly operatively connecting a cap end of the cylinder to a pump and operatively connecting a rod end of the cylinder to a tank.

8. The method according to claim 3, wherein the biasing member is a spring.

* * * * *